United States Patent [19]  
Tsuji et al.

[11] Patent Number: 4,914,076  
[45] Date of Patent: Apr. 3, 1990

[54] METHOD OF PRODUCING AN ADSORBENT FOR SEPARATION AND RECOVERY OF CO

[75] Inventors: Toshiaki Tsuji; Akira Shiraki; Hiroaki Shimono, all of Amagasaki, Japan

[73] Assignee: Kansai Netsukagaku Kabushiki Kaisha, Amagasaki, Japan

[21] Appl. No.: 278,509

[22] Filed: Dec. 1, 1988

[30] Foreign Application Priority Data

Dec. 12, 1987 [JP] Japan ................................. 62-315054

[51] Int. Cl.$^4$ .......................... B01J 20/08; B01J 20/10
[52] U.S. Cl. ..................................... 502/407; 502/415
[58] Field of Search .................... 502/415, 404, 407

[56] References Cited

U.S. PATENT DOCUMENTS

| | | | |
|---|---|---|---|
| 3,575,885 | 4/1971 | Hunter et al. | 502/415 |
| 4,019,879 | 4/1977 | Rabo et al. | 55/68 |
| 4,127,503 | 11/1978 | Yoshikawa et al. | 502/404 |
| 4,470,829 | 9/1984 | Hirai et al. | 55/68 |
| 4,713,090 | 12/1987 | Yokoe et al. | 502/415 |

FOREIGN PATENT DOCUMENTS 124638  10/1986  Japan ................................. 502/415

Primary Examiner—Carl F. Dees  
Attorney, Agent, or Firm—Armstrong, Nikaido, Marmelstein, Kubovcik & Murray

[57] ABSTRACT

The adsorbent for separation and recovery of CO is prepared by contacting an alumina or silica-alumina carrier with a mixed solution or dispersion of a cupric salt and a reducing agent in a solvent and, then, removing the solvent. The preferred cupric salt is cupric chloride.

4 Claims, No Drawings

METHOD OF PRODUCING AN ADSORBENT FOR SEPARATION AND RECOVERY OF CO

BACKGROUND OF THE INVENTION

This invention relates to a method of producing a solid adsorbent for the separation and recovery of CO from any mixed gas containing CO by pressure swing adsorption (hereinafter referred to as PSA) and/or temperature swing adsorption (hereinafter referred to as TSA).

Representative gases containing CO as a main component include converter gas from steelmill converters, blast furnace gas from blast furnaces, electric furnace gas from electric furnaces and producer gas which can be obtained by gasifying coke. Most of these gases have been used as fuels and contain around 70% by volume or more of CO. Therefore, if the CO contained in these gases can be separated or recovered in high purities, it may be utilized as a starting material for synthesizing formic acid, acetic acid, etc., or a reducing agent for reduction of organic compounds, etc., thus affording great benefits to chemical industries.

Heretofore, as processes for the separation and recovery of CO from gases containing CO as a main component, there have been known the low-temperature processing technology, the cuprous ammonium process, COSORB process and so on. These processes involve such disadvantages as high equipment costs and high costs of utilities such as electric power, steam and other thermal energies, so that although they are suitable for the mass separation and recovery of CO in large quantities, they are not necessarily suitable for the separation and recovery of CO on a medium or small scale. Moreover, since the CO obtained by such known methods contain impurities such as $O_2$, $CO_2$, etc., which are deleterious to reactions of organic syntheses, it cannot be utilized in organic syntheses.

As methods for accomplishing a selective separation of specific gases from medium or small volumes of material gases, PSA and TSA methods are known.

The PSA method is a method for selective separation of a specified gas from a mixed gas and comprises adsorbing the desired gas on an adsorbent at a high pressure and then, desorbing the adsorbed gas under reduced pressure. In the industrial application of the process, a plurality of columns packed with the adsorbent are installed and in each adsorption column, a series of operations of pressure-up—adsorption—cleaning—degassing is repeated so as to effect a continuous separation and recovery of the product gas as a whole.

The TSA method, like the aforementioned PSA method, is a method for selective separation of a specified gas from a mexed gas. Thus, the desired gas is first absorbed on an adsorbent at a low temperature and then, by raising the temperature of the adsorption system, the adsorbed gas is desorbed.

Heretofore, as a process embodying the principle of this PSA method, a process utilizing mordenitic zeolite as the adsorbent has been proposed. (Japanese Patent Un-Examined Publication No. 22625/1984; ibid. No. 49818/1984.)

Furthermore, for the separation and recovery of CO from a mixed gas containing CO according to the principle of the PSA or TSA method, various processes employing copper compounds, such as cuprous halides, cuprous oxide, cupric salts, cupric oxide, etc., as supported on active carbon have been proposed. (Japanese Patent Un-Examined Publication Nos. 156517/1983, 69414/1984, 105841/1984 and 136134/1984.)

As a method of preparing a CO adsorbent for use in the separation and recovery of CO from mixed gases containing CO by the PSA or TSA method, there has been proposed a process which comprises contacting an organic solvent solution of cuprous halide and alminium halide with a porous inorganic oxide(s) such as alumina, silica or silica/alumina, etc., and then, removing the free organic solvent. (Japanese Patent Un-Examined Publication Nos. 90036/1985 and 90037/1985.)

The applicant of the present invention has already filed a Japanese patent application for a method of producing an adsorbent consisting of a silica and/or alumina carrier and a cuprous compound or a cupric compound or a reduction product thereof as supported thereon for the separation and recovery of CO from mixed gases containing CO by the PSA or TSA method. (Japanese Patent Un-Examined Publication No. 242638/1986)

As the properties required of an adsorbent to be packed into an adsorption column in the practice of the PSA or TSA method, there may be mentioned: (i) it is capable of selective adsorption of the object component to the exclusion of other coexisting components, (ii) there is a large difference in the adsorption rate of the object component between the time when the column is under pressure or at low temperature and the time when the column is under reduced pressure or at high temperature, (iii) removal of the adsorbed object component is easy, (iv) other components are not easily adsorbed and desorbed, and (v) the life span of the adsorbent is long. The above properties are important factors in the PSA or TSA method, for the purity and yield of the product gas are greatly influenced by these properties.

The method utilizing mordenitic zeolite, which takes advantage of physical adsorption-desorption, involves the following problems. Because the inherent adsorption capacity of this adsorbent for CO is relatively small, the frequency of pressure swing must be increased and this results in disadvantages not only in operation but also in the service lives of various valves. Moreover, prior to the adsorption stage, $CO_2$ must be removed previously. The purity of the product CO gas is low because of concomitant adsorption of $N_2$ and, furthermore, because a large amount of product CO gas must be used for the cleaning of the inner parts of the column for removal of adsorbed $N_2$, the yield of the product CO is decreased.

On the other hand, the method using an adsorbent having a copper compound carried on active carbon, which takes advantage of chemical adsorption-desorption, involves the following problems. Thus, when CO is to be separated from a mixed gas containing CO, $N_2$ $CO_2$, etc., the $CO_2$, etc. tend to be co-adsorbed, together with CO and therefore, it is difficult to obtain high purity CO. Moreover, the CO adsorption capacity of the adsorbent is not necessarily large. For these reasons, his method has not yet reached the stage of implementation on an industrial scale.

The method which comprises using an adsorbent having cuprous halide and aluminum halide as supported on a porous inorganic oxide takes advantage mainly of the selective CO adsorbency of $CuAlX_4$ (X is halogen). However, this method still needs to be improved for industrial application in such respects as that because its adsorbing capacity for CO is too great, it is difficult to remove the adsorbed CO at the step of degassing and the technology is accordingly not suitable particularly for the PSA method. In addition, the preparation of the adsorbent must be performed in a dry inert gas atmosphere and it is difficult to restore the activity of the adsorbent once it has been degraded.

Then, the invention described in Japanese Patent Un-Examined Publication No. 242638/1986 as filed by this applicant, namely the method using an adsorbent comprising a silica or/and alumina carrier and either a cuprous compound or a cupric compound or a reduction product thereof as supported thereon has the advantage that it affords a separation and recovery of CO of extremely high purity but still remains to be improved from industrial points of view.

Thus, when a cuprous compound is chosen as the compound to be supported on a silica or/and alumina carrier, it is commercially common practice to dissolve the cuprous chloride in concentrated hydrochloric acid, treat the carrier with the resulting solution and dry the same. However, the use of concentrated hydrochloric acid involves a high risk of injury to the operator and the preparation, supporting and drying steps must be carried out in an inert gas, thus complicating the production process. Moreover, when hydrochloric acid is used as the solvent, the crushing strength of the carrier itself is sacrificed so that the life of the column packing is shortened. Another disadvantage is that the dispersion within the carrier is poor as compared with the case in which a cupric compound is employed.

On the other hand, when a cupric compound is chosen as the compound to be supported on a silica or/and alumina carrier, it is commercially common practice to use cupric chloride However, when cupric chloride is used alone, the heat treatment for increasing the CO adsorption/desorption capacity of the adsorbent must be carried out at a comparatively high temperature. Furthermore, even if the temperature of the heat treatment is so increased and the heat treatment is further followed by heat treatment in a reducing atmosphere such a CO or $H_2$, the CO adsorption/desorption capacity is not increased as much as desired.

In view of this situation, the present invention has been accomplished as a result of diligent research pursued in an effort to find out an adsorbent which is capable of making a separation and recovery of high purity CO with high efficiency from any mixed gas containing CO.

SUMMARY OF THE INVENTION

The method of this invention for the manufacture of an adsorbent for separation and recovery of CO comprises contacting an alumina or/and silica carrier with a solvent solution or dispersion of a cupric salt and a reducing agent and, then, removing the solvent. The method is further described below in detail.

DETAILED DESCRIPTION OF THE INVENTION

In accordance with this invention, either (a) alumina or (b) silica-alumina is used as the carrier.

The alumina can be prepared, for example, by precipitating aluminium hydroxide from an aqueous solution of a water-soluble aluminum salt and, after recovery thereof by filtration, igniting the same. The silica can be prepared, for example, by neutralizing an aqueous solution of sodium silicate with an acid such as HCl, washing the resulting precipitate with water, drying the same, and, if necessary, activating it by heating under reduced pressure and pulverizing the same. When the silica and alumina are to be used in combination, one may adopt any of various procedures such as mechanical blending of silica and alumina, kneading of the two materials in wet condition, immersion of an aluminum salt in silica gel, simultaneous gelation of silica and alumina from an aqueous system, and deposition of alumina gel on silica gel.

Such alumina or silica-alumina is commercially available. In the practice of this invention, in consideration of pressure loses after packing into a column, choice is made of a carrier having a grain size of about 1 to 7 mm and the carrier is used after drying if necessary.

This alumina or silica-alumina carrier is contacted with a solvent solution or dispersion of a cupric compound and a reducing agent and, then, the solvent is removed to give the desired adsorbent.

The cupric salt may be a cupric halide such as cupric chloride, cupric fluoride, cupric bromide, etc. and is preferably cupric chloride.

The reducing agent is a salt of a metal in a low-valance state or an organic compound in a low degree of oxidation.

Such low-valance metal salt includes, among others, salts of iron (II), tin (II), titanium (III) and chromium (II). The organic compound in a low degree of oxidation includes, among others, aldehydes, saccharides, formic acid, oxalic acid and so on. The solvent may for example be water, formalin, formic acid, alcohol or the like. For commercial purposes, water is most advantageous.

There is no critical limitation on the proportion of such cupric salt relative to the alumina or silica-alumina carrier but the amount of cupric salt is selected generally within the range of 0.5 to 10 mmols/g and preferably within the range of 1 to 5 mmols/g. If the proportion of cupric salt is too small, there will not be obtained a sufficient CO absorption capacity, while an excessive proportion rather leads to a decrease in separation efficiency.

The amount of the reducing agent is essentially the amount necessary to convert cupric ion to cuprous ion and the reducing agent is, therefore, generally used in substantially the same molar equivalent as the cupric salt to be reduced However since saccharides such as granulated sugar have 1- to 5-fold reducing powers on an equimolar basis, it is not always necessary to use such reducing agents in equimolar amounts. Preferably, the reducing agent is used in the range of 0.01 to 0.30 g/g carrier.

Contact with said solution or dispersion is carried out by saturation, spraying or other technique. Instead of mere saturation or spraying of the carrier with a solution or dispersion containing said cupric salt and reducing agent, one may subject the carrier to vacuum degassing and, then, contact it with said solution or dispersion or alternatively first contact the carrier with the solution or dispersion and, then, subjecting the same to vacuum degassing.

After such contact, the solvent is removed by an appropriate method in atmospheric air or in an inert gas such as nitrogen or argon gas. This removal of the solvent can be accomplished by mere heating or by drying under reduced pressure.

Upon drying, there is obtained an adsorbent having a satisfactory CO adsorption capacity. However, by subjecting this adsorbent further to a heat treatment in an inert gas such as $N_2$, Ar or He or in a reducing gas such as CO or $H_2$, one may obtain an adsorbent displaying a still improved CO adsorption capacity. Which of an inert gas and a reducing gas is employed, the heat-treating temperature can be appropriately selected from the range of 100° to 500° C. and preferably 150° to 350° C.

The adsorbent obtained in the above manner is packed into a column and using the packed column, the desired separation and recovery of CO from a CO-containing mixed gas can be accomplished by the PSA method or the TSA method.

In conducting the separation and recovery of CO by the PSA method, the adsorption pressure to be used in the adsorption process is not less than atmospheric and preferably 0 to 6 kg/cm$^2$G, for instance, and the degree of vacuum in the vacuum degassing process is preferably in the range of 200 to 10 Torr.

In the separation and recovery of CO by the TSA method, the adsorption temperature in the adsorption process is preferably about 0° to 40° C., for instance, and the degassing temperature in the degassing process is preferably about 60° to 180° C.

It is also possible to utilize the PSA and TSA methods in combination and to carry out the adsorption stage at a low temperature and at a pressure not less than atmospheric and the degassing stage at a high temperature and at a pressure not less than atmospheric.

Since the TSA method is less advantageous than the PSA method in terms of energy consumption, the PSA process or a PSA-TSA combination process is commercially preferred.

The CO-containing mixed gas which can be used includes, among others, converter gas which is available from the converter in a steel mill. Converter gas usually contains not only the main component CO gas but also $O_2$, $CH_4$ and other hydrocarbons, and such minor components as $H_2S$, $NH_3$ and so on. Aside from converter gas, other mixed gases such as blast furnace gas, electric furnace gas, and producer gas can be used as raw materials.

Prior to the step for the recovery and separation of CO, it is preferable to provide steps for the adsorptive removal of impurities such as sulfur compounds, $NH_3$, etc., removal of water, and removal of $O_2$. However, it is not necessary to provide steps for removal of $CO_2$ and $N_2$.

Compared with the technology of supporting a cuprous compound on an alumina or silica-alumina carrier with hydrochloric acid, the method of this invention offers the following advantages.

(1) Since hydrochloric acid (concentrated hydrochloric acid) is not used, the workability is improved.

(2) Since hydrochloric acid (concentrated hydrochloric acid) need not be used, the crushing strength of the carrier is not adversely affected so that the life of the column packing is prolonged.

(3) The supporting procedure can be carried out in the atmospheric air and the drying procedure need not be essentially carried out in an inert gas but can be carried out in the atmospheric air. Consequently, the method assures an enhancement of productivity.

(4) Since the cupric salt and the reducing agent are efficiently supported even within the pores of the carrier, the microphones conducive to physical adsorption of $N_2$ and $CO_2$ are eliminated. As a result, the adsorption of the components of the mixed gas, other than CO, is minimized and, hence, the product CO of extremely high purity can be recovered.

Furthermore, compared with the technology of supporting a cupric compound alone on an alumina or silica-alumina carrier, the method of this invention is such that the cupric salt is efficiently reduced at a low heat-treating temperature and in the state effectively carried even within the carrier pores, with the result that the adsorption and desorption of CO are most efficiently accomplished.

Therefore, this invention is of great utility in chemical industry as a method of producing an adsorbent for use in the separation and recovery of high-purity CO from converter gas or any other CO-containing mixed gas.

The cupric salt supported on an alumina or silica-alumina carrier is efficiently reduced by the reducing agent, which has been simultaneously supported, presumably into a mixture of cuprous and cupric salts or a compound having an intermediate valence between I and II. Moreover, when a heat treatment is carried out, the unreduced cupric salt is further reduced to a compound effective for the adsorption-desorption of CO.

The CO adsorption-desorption by the solid adsorbent according to this invention is mainly due to reversible chemical reactions (complex-forming reaction and dissociation reaction) between CO and the cupric compound efficiently reduced by the reducing agent concomitantly supported on the carrier (there is no chemical reaction with $N_2$ and $CO_2$) and, in a minor part, to the physical adsorption of $N_2$ and $CO_2$ on the surface of the alumina or silica-alumina carrier and the subsequent desorption thereof.

The following examples are intended to illustrate this invention in further detail and should by no means be construed as delimiting the scope of the invention.

EXAMPLE 1

In a 200 cc conical flask, 13.5 g of cupric chloride and 5.0 g of granulated sugar were dissolved in 25 cc of water to prepare a mixed solution of cupric chloride and sugar.

To this solution was added 30.2 g of alumina pre-dried at 110° C. for about 4 hours (average grain size 3 mm, manufactured by Sumitomo Chemical Co., Ltd., NKH3-24) and the mixture was stirred in the air for 10 minutes. Then, the solvent was evaporated in an $N_2$ gas stream in a mantle heater at 220° C. and the residue was cooled to room temperature to give an adsorbent for separation and recovery of CO.

The adsorbent prepared as above was packed into a column (15 mm dia. × 300 mmH) and a mixed gas of 71.2 vol. % CO, 12.3 vol. % $N_2$ and 16.5 vol. % of $CO_2$ was passed at atmospheric pressure and 25° C. The amount of CO adsorbed on the column was 21.7 cc/cc.

After the adsorption procedure, the column was stripped with 100 cc of CO and using a vacuum pump, desorption was carried out at a pressure of 35 Torr for 5 minutes to release the adsorbed gas. The amount of release of CO was 9.9 cc/cc. The composition of this recovered gas was CO: 99.8 vol. %
$CO_2$: 0.2 vol. %
$N_2$: Trace When the adsorption procedure was repeated under the same conditions, CO was adsorbed in the same amount as in the first run.

There was no change in the amount of adsorption or desorption of CO when the same procedure was further repeated.

EXAMPLE 2

An adsorbent was prepared in the same manner as Example 1 except that NKHD-24 (Sumitomo Chemical Company, Ltd.) was used as the alumina carrier material and the adsorption and desorption of CO were investigated.

The results were as follows.
CO adsorbed: 21.2 cc/cc
CO released: 10.2 cc/cc

EXAMPLE 3

The same procedure as Example 1 was repeated except that 32.4 g of AH-Sll (Fujimi Kemmazai Kogyo Co., Ltd.) was used as the alumina carrier material.

The results were as follows.
CO adsorbed: 11.1 cc/cc
CO released: 6.3 cc/cc

EXAMPLE 4

The same procedure as Example 1 was repeated except that 39.0 g of Neobead-SA (Mizusawa Chemical Industries, Ltd.) was used as the alumina carrier material.

The results were as follows.
CO adsorbed: 15.2 cc/cc
CO released: 6.8 cc/cc

EXAMPLE 5

The same procedure as Example 1 was repeated except that, as the reducing agent, 3.0 g of stannic chloride was used in lieu of granulated sugar.

The results were as follows.
CO adsorbed: 6.1 cc/cc
CO released: 2.6 cc/cc

EXAMPLE 6

The same procedure as Example 1 was repeated except that, as the reducing agent, ferric chloride was used in lieu of granulated sugar.

The results were as follows.
CO adsorbed: 14.0 cc/cc
CO released: 4.6 cc/cc

EXAMPLE 7

The same procedure as Example 1 was repeated except that, as the reducing agent and solvent, 25 cc of formalin (37% aqueous solution of formaldehyde) was used in lieu of granulated sugar and water.

The results were as follows.
CO adsorbed: 4.5 cc/cc
CO released: 2.2 cc/cc

EXAMPLE 8

The same procedure as Example 1 was repeated except that, as the solvent, 50 cc of ethanol was used in lieu of water.

The results were as follows.
CO adsorbed: 16.2 cc/cc
CO released: 6.9 cc/cc

EXAMPLE 9

The preparation procedure of Example 1 was repeated except that the solution was subjected to 5-hour preliminary drying in the air at 110° C. prior to the heating step at 220° C. in a $N_2$ gas stream.

The amounts of CO adsorbed and desorbed were comparable to those obtained in Example 1.

EXAMPLE 10

The procedure of Example 9 was repeated except that the preliminary drying was carried out in the air at room temperature for 48 hours.

The results were as follows.
CO adsorbed: 20.1 cc/cc
CO released: 9.5 cc/cc

COMPARATIVE EXAMPLE 1

The procedure of Example 1 was repeated except that 30.2 g of the same alumina as used in Example 1 was added to a solution of 13.5 g of cupric chloride in 25 cc of water.

This adsorbent did not substantially adsorb CO.

COMPARATIVE EXAMPLE 2

The procedure of Example 1 was repeated except that 30.2 g of the same alumina as used in Example 1 was added to a solution of 13.5 g of cupric chloride in 25 cc of ethanol.

As shown below, the results were inferior to those obtained in Example 8.
CO adsorbed: 10.0 cc/cc
CO released: 4.2 cc/cc

EXAMPLE 11

To investigate the particle strength of the adsorbent obtained by the method of this invention, 20 beads of the adsorbent of Example 1 (Bead A) were sampled and the crushing strength of the beads was determined using a Kiya-type crushing strength tester.

For comparison, the control test was carried out using the same alumina MKH3-24 as used in Example 1 (Bead B) and the CO adsorbent prepared by supporting cuprous chloride on the same alumina with the aid of hydrochloric acid (Bead C).

The results are shown in the following table.

|  | Bead A | Bead B | Bead C |
| --- | --- | --- | --- |
| Compressive strength (kg) | 5.80 | 3.87 | 1.38 |
| CO adsorbed (cc/cc) | 21.7 | — | 22.6 |
| CO released (cc/cc) | 9.9 | — | 9.7 |

It is apparent from the above results that the adsorbent obtained by the method of this invention is superior to the very carrier used in its preparation and the cuprous chloride-HCl adsorbent in crushing strength and in CO adsorption and desorption capacities.

What is claimed is:

1. A method of producing an adsorbent for separation and recovery of CO which comprises contacting an alumina or silica-alumina carrier with a mixed solution or dispersion of a cupric salt and a reducing agent in a solvent and, then, removing the solvent, wherein said reducing agent is a salt of a metal in a low valence state or an organic compound which is in a degree of low oxidation.

2. The method of claim 1 wherein the amount of said cupric salt relative to said carrier is 0.5 to 10 mmols/g and the amount of said reducing agent supported on the carrier is sufficient to reduce the cupric ion supported on the carrier to cuprous ion.

3. The method of claim 1 wherein, after removal of the solvent, the adsorbent is further subjected to heat treatment in an inert gas or reducing gas atmosphere.

4. The method of claim 1 wherein said cupric salt is cupric chloride.

* * * * *